United States Patent [19]

Lim et al.

[11] Patent Number: 4,820,597
[45] Date of Patent: Apr. 11, 1989

[54] EXTENDED LIFE NICKEL-HYDROGEN STORAGE CELL

[75] Inventors: Hong S. Lim, Agoura; Scott A. Verzwyvelt, Newbury Park, both of Calif.

[73] Assignee: Hughes Aircraft Company, Los Angeles, Calif.

[21] Appl. No.: 131,974

[22] Filed: Dec. 11, 1987

[51] Int. Cl.⁴ .......................................... H01M 10/34
[52] U.S. Cl. ...................................... 429/50; 429/27; 429/101; 429/206
[58] Field of Search ............... 429/101, 27, 57, 50, 429/206, 207; 320/2

[56] References Cited

U.S. PATENT DOCUMENTS

| | | | |
|---|---|---|---|
| 3,867,199 | 2/1975 | Dunlop et al. | 429/101 |
| 4,127,703 | 11/1978 | Holleck | 429/101 X |
| 4,250,235 | 2/1981 | Du Pont et al. | 429/211 |
| 4,420,545 | 12/1983 | Meyer et al. | 429/101 |
| 4,584,249 | 4/1986 | Smithrick | 429/101 X |
| 4,683,178 | 7/1987 | Stadnick et al. | 429/101 |

*Primary Examiner*—Anthony Skapars
*Attorney, Agent, or Firm*—Wanda K. Denson-Low; A. W. Karambelas

[57] ABSTRACT

A nickel-hydrogen electrical storage cell contains a nickel positive electrode, a hydrogen negative electrode, a separator between the electrodes, an electrolyte including rubidium hydroxide and cesium hydroxide, and a pressure vessel to contain these elements. The cell is expected to operate for extended cycle life in deep discharge conditions based upon extrapolations of accelerated life testing results. The electrolyte may be essentially entirely rubidium hydroxide or cesium hydroxide, a mixture of the two, or a mixture with another component.

14 Claims, 2 Drawing Sheets

EXTENDED LIFE NICKEL-HYDROGEN STORAGE CELL

BACKGROUND OF THE INVENTION

This invention relates generally to pressurized nickel-hydrogen storage cells, and, more particularly, to the use of such cells in extended life and deep discharge applications.

Rechargeable cells or batteries are electrochemical devices for storing and retaining an electrical charge and later delivering that charge for useful power. A familiar example of the rechargeable cell is the lead-acid cell used in automobiles. Another type of cell having a greater storage capacity for its weight is the nickel oxide pressurized hydrogen cell, an important type of which is commonly called the nickel-hydrogen cell and is used in spacecraft applications.

The nickel-hydrogen cell includes a series of active plate sets which store a charge electrochemically and later deliver that charge as a useful current, packaged within a pressure vessel that contains the electrolyte, the plate sets, and the hydrogen gas that is an essential active component of the cell. A nickel-hydrogen storage cell delivers current at about 1.3 volts, and a number of the cells are usually connected in series to produce current at the voltage required by the systems of the spacecraft.

A nickel-hydrogen cell used in a satellite is periodically charged by electrical current produced by solar panels on the spacecraft when the satellite is in sunlight, and then later discharged to supply electrical power, when the spacecraft is in shadow or peak electrical power is demanded. A satellite is a low earth orbit may experience up to about 6,000 cycles from light to dark conditions per year, with a corresponding number of cycles of charging and discharging the cells. A typical accepted industry design objective is attaining satisfactory operation through 30,000 cycles of charging and discharging, corresponding to an operating life of 5 years for the satellite in low earth orbit, or more yearsin other orbits where fewer battery cycles are experienced annually.

As the nickel-hydrogen cell cycles thousands of times, the maximum charge that it will hold gradually decreases, apparently due to chemical changes that occur slowly in the nickel electrode. The rate of the gradual diminution in cell capacity may be reduced by decreasing the depth of discharge of the battery. The depth of discharge is the percentage of the total charge capacity that is used during the discharge portion of the cycle prior to recharging the cell.

Present, state of the art, nickel-hydrogen cells using a 31 percent potassium hydroxide electrolyte can be cycled 30,000 times without unacceptable loss in charge capacity, but the depth of discharge must be held to about 30 percent or less to do so. That is, only about 30 percent or less of the electrical energy stored in the cell can be discharged during the discharge cycle. Alternatively stated, 70 percent or more of the stored energy is unusable and unavailable. Regular discharging of a higher fraction of the stored energy (termed "deep discharge") would cause an accelerated subsequent reduction in the total cycling capacity of the cell, resulting in a reduction in its operating life.

This limitation on the cell operating procedures greatly and adversely influences the ratio of stored energy per pound of cell weight. The ratio of stored energy to weight is a key spacecraft design consideration. The weight of the cell must be lifted to orbit, and with present launch vehicles the cost of moving a pound from the surface of the earth to orbit is typically $20,000. The ratio of stored energy per pound of weight could be significantly increased if the allowable depth of discharge could be increased.

Accordingly, there exists a need for an improved method of storing and delivering energy in a spacecraft. The method must provide the necessary cycles of operation with an acceptably low reduction in storage capacity, and provide an increased allowable depth of discharge under these conditions. The present invention fulfills this need, and further provides related advantages.

SUMMARY OF THE INVENTION

The present invention includes a process for providing stored electrical energy under conditions of deep discharge and extended operating life, without unacceptable loss of battery capacity. The storage cell of the invention utilizes elements of proven technology, reducing the technical risk in its use. With this invention, the weight of the storage cells to provide a required power level can be significantly reduced as compared with existing approaches and known alternatives.

In accordance with the invention, a process for providing battery power comprises the steps of providing a nickel oxide-pressurized hydrogen gas cell having an electrolyte including at least about 30 mole percent of a hydroxide having a concentration of no more than about 8 molar, the hydroxide being selected from the group consisting of rubidium hydroxide and cesium hydroxide; and repeatedly charging and discharging the cell. In another form, a process for providing battery power comprises providing a nickel oxide-pressurized hydrogen gas cell having an electrolyte including a hydroxide selected from the group consisting of rubidium hydroxide and cesium hydroxide; charging the cell; discharging at least about 40 percent of the charge in the cell; and repeating said steps of charging and discharging.

The invention also extends to the cell itself, in addition to the process for providing energy. In accordance with this aspect of the invention, an electrical storage cell having an extended life under deep discharge operating conditions comprises an active plate set, the plate set including a nickel positive electrode, a hydrogen negative electrode, a separator between the positive electrode and the negative electrode, and an electrolyte including at least about 30 mole percent of a hydroxide selected from the group consisting of rubidium hydroxide and cesium hydroxide, the concentration of the hydroxide being no greater than about 8 molar; and a pressure vessel that contains the positive electrode, the negative electrode, the separator, and the electrolyte.

The electrolyte includes rubidium hydroxide or cesium hydroxide. The electrolyte may be entirely one or the other of these hydroxides, a mixture of the two, or a mixture of one or the other of the hydroxides with another component. When mixtures with another component are used, the amount of the rubidium hydroxide or cesium hydroxide, expressed in moles, should be at least about 30 percent, preferably at least about 50 percent, of the total moles of electrolyte. The concentration of the rubidium hydroxide or cesium hydroxide electrolyte should not be greater than about 8 molar, and is preferably about 6 molar.

The inclusion of rubidium hydroxide or cesium hydroxide in the electrolyte results in an unexpectedly large increase in allowable depth of discharge that may be successfully utilized in extended operations of the cell involving thousands of cycles. Accelerated testing on nickel electrodes has showed that the electrode in rubidium hydroxide or cesium hydroxide electrolyte can undergo over 8600 cycles at 100 percent discharge, as compared with only about 6000 cycles in a conventional 31 percent potassium hydroxide electrolyte.

It will be appreciated that the cell and the process of the invention permit greatly improved cell operation in extended life at deep discharge conditions. Increasing the allowable depth of discharge according to the present invention significantly reduces the weight of cells needed to achieve a required total stored energy delivery. Other features and advantages of the invention will be apparent from the following more detailed description, taken in conjunction with the accompanying drawings, which illustrate, by way of example, the features of the invention.

DETAILED DESCRIPTION OF THE PREFERRED EMBODIMENT

Figure 1:
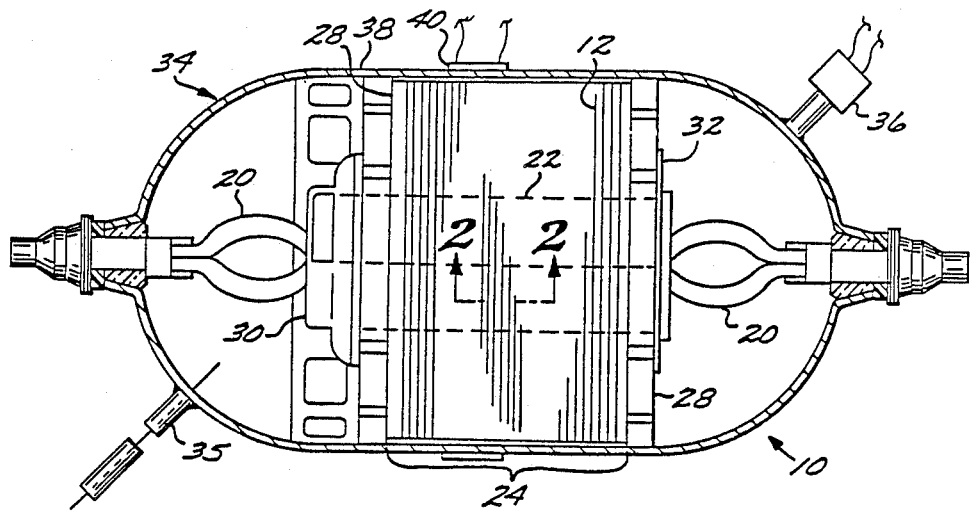
FIG. 1 is a sectional elevational view of a flight-type nickel-hydrogen cell.
Figure 2:
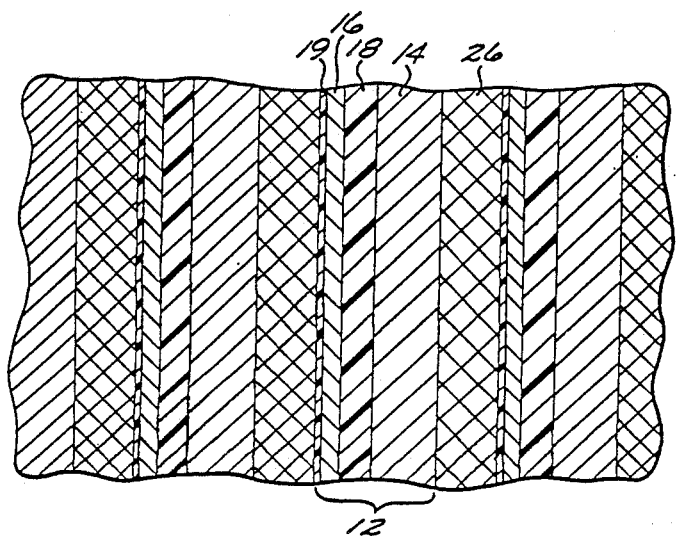
FIG. 2 is a sectional view of a detail of FIG. 1, taken generally on line 2—2, illustrating the plate sets.

The present invention relates to a nickel-hydrogen storage cell 10, as illustrated in FIGS. 1 and 2, of the pressurized gas-metal cell type. Such a cell 10 typically comprises a plurality of individual plate sets 12. Each plate set 12 in turn comprises an anode or positive electrode 14, a cathode or negative electrode 16, and an electrolyte-containing separator 18, which physically separates the electrodes 14 and 16, and also supplies the electrolyte medium through which ionic and electron transfer occur. Charging and discharging of the plate set 12 are accomplished through electrical leads 20.

Various constructions of nickel-hydrogen cells and components are disclosed in the following U.S. patents, whose disclosures are herein incorporated by reference: U.S. Pat. Nos. 4,283,844; 4,262,061; 4,250,235; 4,000,350; and 3,669,744.

The positive electrode 14 is formed by impregnating nickel hydroxide into porous sintered nickel that is supported on an etched nickel electrode substrate. The negative electrode 16 is coated on one side by a sintered mixture of platinum black and polytetrafluoroethylene, and on the other side with a porous layer of polytetrafluoroethylene 19. These layers are applied to a nickel substrate in the form of etched sheet or a woven mesh, to form the negative electrode 16. Many different types of separators 18 have been used, including, for example, asbestos, nylon, and a cloth of zirconium oxide-yttrium oxide containing polysulfone. The electrolyte is impregnated into the separator 18 in this flight-type cell.

The individual plate sets 12 are assembled onto a central core 22 to form a stacked array 24. In forming the stacked array 24, a monofilament polypropylene screen 26 is placed between each plate set 12, so that oxygen liberated during overcharging at each positive electrode 14 can diffuse away from the electrode 14 and to the negative electrode 16 to combine with hydrogen. The stacked array 24 is placed under a longitudinal pressure of, for example, about 10 pounds per square inch, by tightening compression plates 28 against each end of the stacked array 24. The tightening of the compression plates 28 is preferably accomplished by compressing the array 24 and then tightening a nut 30 on threads on the core 22, thereby compressing a Belleville washer set 32 against the compression plate 28 to hold the stacked array 24 in place.

The stacked array 24 is sealed within a pressure vessel 34, manufactured of a material such as Inconel 718 nickel-based alloy which can withstand internal pressures on the order of 1,000 psi, without damage by hydrogen embrittlement or corrosion by the electrolyte. A gas fill tube 35 allows gas content and pressure within the pressure 34 to be controlled, if necessary. The pressure vessel 34 is typically constructed in the form of a cylindrical tube having domed ends. By way of illustration, the cell 10 having the pressure vessel 34 of external dimensions $3\frac{1}{2}$ inches diameter and 13 inches long can contain about 40 individual plate sets 12, with a resulting electrical storage capacity of the cell of about 50 ampere-hours. The cell 10 may be charged and discharged through thousands of cycles without apparent physical damage to the components, if the charging and discharging are accomplished properly. A number of cells 10 are typically combined a series and parallel arrangements to produce a battery with the required voltage and current delivery characteristics.

Charging is accomplished by impressing a voltage through the leads 20 across each plate set 12 so that electrons flow from the electrode 16 to the electrode 14. Electrical energy is thereby stored in each plate set in the form of chemical reactants, for subsequent discharging to produce a usable current. A nickel-hydrogen cell of the type described previously may be fully charged by a solar cell array to a capacity of, for example, about 50 ampere hours, using a current of about 5 amperes at 1.5 volts, through a charging period of about 14 hours from a discharged state. The voltage and charging time vary, depending upon the power available from the solar cell and the cycle dictated by the orbit of the spacecraft.

The cell 10 is normally instrumented to monitor its operational state. As the nickel-hydrogen cell is charged, hydrogen is evolved, and the pressure within the sealed pressure vessel 34 increases. The rise in pressure may be measured directly by a pressure transducer 36, which measures the pressure within the pressure vessel 34. Alternatively, the rise in pressure may also be deduced by measuring a quantity which responds to pressure, specifically the deformation in the wall 38 of the pressure vessel 34. That is, as the pressure within the pressure vessel 34 increases, the pressure vessel tends to expand and bulge slightly. A strain gauge 40 fastened to the wall 38 of the pressure vessel 34 measures the bulging of the wall, which is a function of, and preferably proportional to, the internal gas pressure within the vessel 34.

The lifetime of present nickel-hydrogen cells is limited by the life of the nickel electrodes. In state-of-the-art cells, the hydrogen electrode and other components last much longer than does the nickel electrode. Evaluation of the effects of the electrolyte on the cell life have therefore been conducted in accelerated life tests of the nickel electrode.

Figure 3:
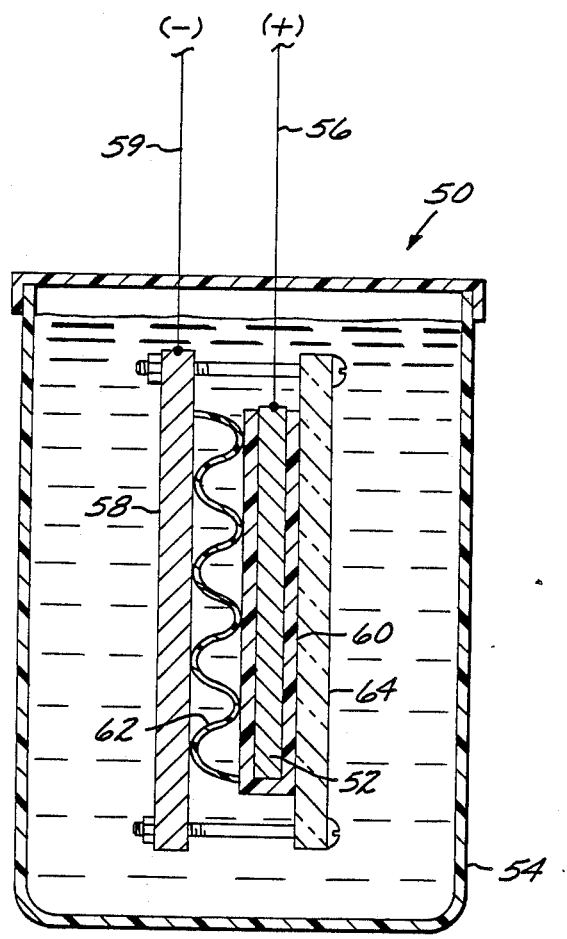
FIG. 3 is an elevational view of the apparatus for conducting accelerated life testing of cells.

Rubidium hydroxide and cesium hydroxide aqueous electrolytes were compared with other previously used and candidate electrolyte materials in accelerated life testing of a nickel electrode in a test cell depicted in FIG. 3, which simulates performance of the nickel electrode in the flight-type cell 10. Such a test cell gives relative cycle lives for different electrolytes that are in agreement with those of a flight-type cell, although the absolute cycle lives may differ with those of the flight-type cell. A test cell 50 includes a nickel test electrode 52 supported vertically in a polyethylene beaker 54 and electrically connected to a positive lead 56. The test electrode 52 is manufactured by a dry powder sinter technique and is similar to the flight-type electrodes discussed previously. The electrode is about 3 centimeters by 5 centimeters in size. The electrode 52 has a theoretical capacity of 0.493 ampere-hours (Ah). Actual initial capacities were measured and are reported, but were generally near to this value.

A nickel sheet counter electrode 58 is supported vertically, parallel to the electrode 52, and connected to a negative lead 59. A nylon separator 60 covers the positive electrode 52, and there is a polypropylene gas screen 62 between the separator-covered electrode 52 and the negative electrode 58. These components are supported on a plexiglass mounting plate 64 with bolts that maintain the distance between the electrodes 52 and 58 as about 0.04 inches. The beaker 54 is filled to a level above the electrodes 52 and 58 with an aqueous solution of the electrolyte, in this instance 120 milliliters of electrolyte.

Testing was performed with duplicate cells and operating conditions. The table reports the electrolyte composition, initial capacity, and the number of cycles after which the capacity had fallen to 75 percent or less of the initial capacity:

| Electrolyte Composition | Initial Capacity Ah | Cycles to 75% of Initial Capacity |
|---|---|---|
| 5.74 M NaOH | 0.47 | 1490 |
| 5.74 M NaOH | 0.48 | 1630 |
| 5.72 M KOH | 0.53 | 6090 |
| 5.72 M KOH | 0.52 | 5680 |
| 5.92 M RbOH | 0.52 | >>8600 |
| 5.92 M RbOH | 0.51 | >>8600 |
| 6.06 M CsOH | 0.48 | 7720 |
| 6.06 M CsOH | 0.47 | >>8600 |
| 4.93 M KOH + 0.8 M LiOH | 0.49 | 660 |
| 4.93 M KOH + 0.8 M LiOH | 0.50 | 310 |
| 5.1 M RbOH + 0.8 M LiOH | 0.45 | 500 |
| 5.1 M RbOH + 0.8 M LiOH | 0.46 | 360 |
| 5.33 M KOH + 0.5 M Ba(OH)$_2$ | 0.48 | 960 |
| 5.33 M KOH + 0.5 M Ba(OH)$_2$ | 0.52 | 2520 |
| 7.37 M NaOH | 0.50 | 2390 |
| 7.35 M KOH | 0.55 | 6180 |
| 7.56 M RbOH | 0.55 | 6280 |
| 5.22 M CsOH + 0.8 M LiOH | 0.42 | 250 |
| 2.86 M KOH + 2.96 M RbOH | 0.52 | >>8600 |
| 2.87 M NaOH + 2.96 M RbOH | 0.47 | 5880 |

In the procedure used to obtain the data reported in the table, the test cycle regime was 24.5 minute discharge at 1.507 amperes followed by a 35.5 minute recharge at 1.056 amperes, except for a short period between 960 and 1760 cycles when charging was at 0.968 amperes. Test cycling was conducted to 100 percent of discharge, so that the entire capacity was discharged on each cycle. The rate of discharge was slowed near the full discharge point by using a diode bypass arrangement. The cell capacity fell from the initial capacity with increasing numbers of cycles, and was measured periodically. In this table, the notation ">>8600" indicates that the number of cycles required before the capacity falls to less than 75 percent is much greater than 8600 cycles, and that the test was discontinued at 8600 cycles with the capacity still well in excess of 75 percent of the initial value. In these instances, the rubidium hydroxide and cesium hydroxide electrolytes permit operation to at least the indicated number of cycles, and in fact may permit operation to much greater numbers of cycles, which can be determined with increasing test time.

The capacity reduction for the rubidium hydroxide and cesium hydroxide electrolytes is substantially less than for other electrolytes, at a corresponding number of cycles. The reduction of capacity to less than 75 percent of the initial capacity occurs at a higher number of cycles for the rubidium hydroxide and cesium hydroxide electrolytes than for other electrolytes, including potassium hydroxide, the present standard. Some mixtures of rubidium hydroxide or cesium hydroxide with other hydroxides also achieve this increased life, as compared with the potassium hydroxide electrolyte.

The improvement of cycle life for the rubidium hydroxide and cesium hydroxide electrolytes is most pronounced for concentrations of about 6M (molar) of the electrolyte in water. Excellent performance is obtained for concentrations no greater than about 8 molar.

In mixtures with the potassium hydroxide electrolyte, the improved cycle life of the rubidium hydroxide cell is observed for mixtures containing 2.86M potassium hydroxide and 2.96M rubidium hydroxide. This mixture is about 50 percent rubidium hydroxide, indicating that the improved results can be obtained in mixtures preferably containing 50 percent or more of the improved electrolyte. It is estimated that the excellent performance is retained in mixtures containing 30 percent or more of the rubidium or cesium hydroxide.

Thus, an electrolyte of rubidium hydroxide or cesium hydroxide, without addition of other components to the electrolyte, is preferred, with the concentration of the hydroxide about 6 molar. The concentration of the hydroxide may be as high as about 8 molar without significant loss of effectiveness. If the rubidium hydroxide or cesium hydroxide is mixed with another component to form the electrolyte, the rubidium hydroxide or cesium hydroxide is preferably at least about 50 mole percent of the electrolyte. It is estimated that the content of the rubidium hydroxide or cesium hydroxide may be reduced to about 30 mole percent or more without significant loss of performance, but that performance is lost for significantly lower mole percents of the rubidium or cesium hydroxide.

The cycle lives of cells containing the improved electrolyte, but discharged to less than 100 percent depth of discharge, can be predicted from this data. Applying a conventional safety factor to the data, it is estimated that the 80 percent depth of discharge for a conventional potassium hydroxide cell is 5000 cycles, and that the corresponding figure for a rubidium hydroxide or cesium hydroxide cell is at least 7500 cycles. The cycle life for lesser depth of discharge is predicted by a theory reported in the publication "A Prediction Model of the Depth-of-Discharge Effect On the Cycle Life of A Storage Cell", by Lawrence H. Thaller and Hong S. Lim, which was published in the Proceedings of the 22nd Intersociety Energy Conversion Engineering Conference, page 751, August 1987. According to these predictions, cycle lives are as follows:

| Depth of Discharge(%) | Life, No. of Cycles | |
| --- | --- | --- |
| | KOH | RbOH |
| 30 | 30000 | >>45000 |
| 40 | 20000 | >>30000 |
| 50 | 14000 | >>21000 |
| 60 | 10000 | >>15000 |
| 70 | 7100 | >>10600 |
| 80 | 5000 | >>7500 |

From these data, it is apparent that the rubidium hydroxide and cesium hydroxide (which is equivalent to rubidium hydroxide in respect to cycle lives in this computation) achieve significantly extended cycle lives in comparison to potassium hydroxide. A 30,000 cycle mission can be accomplished using a 40 percent depth of discharge for the rubidium hydroxide or cesium hydroxide cells, but only a 30 percent depth of discharge for the potassium hydroxide cells. The weight of the improved rubidium hydroxide or cesium hydroxide cells can therefore be made correspondingly less, an important advantage for cells that must be lifted to orbit.

Rubidium hydroxide and cesium hydroxide have been previously used as electrolytes in other types of cells, but their use was directed toward low temperature applications due to their relatively low melting points and low eutectic melting points in some systems. Nothing in the prior work suggests that these electrolytes yield the significantly increased cycle lives in deep discharge cycling, when used in nickel-hydrogen cells.

The development of the improved electrolyte of the invention has been prompted by the use of nickel-hydrogen cells in spacecraft applications. However, the storage of energy in such cells is contemplated in other uses also, such as remote, earthbound solar energy systems, solar powered vehicles, and utility load levelling. The present invention will be useful in these other circumstances as well.

Although a particular embodiment of the invention has been described in detail for purposes of illustration, various modifications may be made without departing from the spirit and scope of the invention. Accordingly, the invention is not to be limited except as by the appended claims.

What is claimed is:

1. A process for providing battery power, comprising the steps of:
   providing a nickel oxide-pressurized hydrogen gas cell having an electrolyte including at least about 30 mole percent of a hydroxide having a concentration of no more than about 8 molar, the electrolyte being selected from the group consisting of rubidium hydroxide and cesium hydroxide; and
   repeatedly charging and discharging the cell.

2. The process of claim 1, wherein the electrolyte includes rubidium hydroxide.

3. The process of claim 1, wherein the electrolyte includes cesium hydroxide.

4. The process of claim 1, wherein the electrolyte consists essentially of rubidium hydroxide.

5. The process of claim 1, wherein the electrolyte consists essentially of cesium hydroxide.

6. The process of claim 1, wherein said cell includes
   an active plate set, the plate set including a nickel positive electrode, a hydrogen negative electrode, and a separator between the positive electrode and the negative electrode, and
   a pressure vessel that contains the positive electrode, the negative electrode, and the separator.

7. A process for providing battery power in a spacecraft, comprising the steps of:
   providing a nickel oxide-pressurized hydrogen gas cell having an electrolyte including a hydroxide selected from the group consisting of rubidium hydroxide and cesium hydroxide;
   charging the cell;
   discharging at least about 40 percent of the charge in the cell; and
   repeating said steps of charging and discharging.

8. An electrical storage cell having an extended life under deep discharge operating conditions, comprising:
   an active plate set, the plate set including a nickel positive electrode, a hydrogen negative electrode, a separator between the positive electrode and the negative electrode, and an electrolyte including at least about 30 mole percent of a hydroxide selected from the group consisting of rubidium hydroxide and cesium hydroxide, the concentration of the hydroxide being no greater than about 8 molar; and
   a pressure vessel that contains the positive electrode, the negative electrode, the separator, and the electrolyte.

9. The cell of claim 8, wherein the hydroxide is at least about 50 mole percent of the electrolyte.

10. The cell of claim 8, wherein the concentration of the hydroxide is about 6 molar.

11. The cell of claim 8, wherein the electrolyte includes rubidium hydroxide.

12. The cell of claim 8, wherein the electrolyte includes cesium hydroxide.

13. The cell of claim 8, wherein the electrolyte consists essentially of rubidium hydroxide.

14. The cell of claim 8, wherein the electrolyte consists essentially of cesium hydroxide.

* * * * *